United States Patent
Aguren (10) Patent No.: US 7,647,327 B2
(45) Date of Patent: Jan. 12, 2010

(54) METHOD AND SYSTEM FOR IMPLEMENTING STORAGE STRATEGIES OF A FILE AUTONOMOUSLY OF A USER

(75) Inventor: Jerry G. Aguren, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 499 days.

(21) Appl. No.: 10/669,822

(22) Filed: Sep. 24, 2003

(65) Prior Publication Data

US 2005/0065961 A1    Mar. 24, 2005

(51) Int. Cl.
G06F 7/00 (2006.01)
G06F 12/00 (2006.01)
G06F 17/30 (2006.01)

(52) U.S. Cl. .................. 707/100; 707/102; 707/200
(58) Field of Classification Search .............. 707/10, 707/100–102, 200, 203–205
See application file for complete search history.

(56) References Cited

U.S. PATENT DOCUMENTS

| | | | |
|---|---|---|---|
| 5,790,789 A | 8/1998 | Suarez | |
| 5,877,759 A | 3/1999 | Bauer | |
| 5,958,010 A | 9/1999 | Agarwal et al. | |
| 5,963,447 A | 10/1999 | Kohn et al. | |
| 5,983,239 A * | 11/1999 | Cannon | 707/200 |
| 6,009,456 A | 12/1999 | Frew et al. | |
| 6,012,152 A | 1/2000 | Douik et al. | |
| 6,021,437 A | 2/2000 | Chen et al. | |
| 6,088,689 A | 7/2000 | Kohn et al. | |
| 6,192,354 B1 | 2/2001 | Bigus et al. | |
| 6,212,649 B1 | 4/2001 | Yalowitz et al. | |
| 6,289,337 B1 | 9/2001 | Davies et al. | |
| 6,341,960 B1 | 1/2002 | Frasson et al. | |
| 6,484,155 B1 | 11/2002 | Kiss et al. | |
| 6,519,612 B1 * | 2/2003 | Howard et al. | 707/200 |
| 6,918,006 B1 * | 7/2005 | Archibald et al. | 711/114 |
| 7,107,385 B2 * | 9/2006 | Rajan et al. | 711/4 |
| 2001/0033551 A1 | 10/2001 | Busuioc et al. | |
| 2002/0040183 A1 | 4/2002 | Iliff | |
| 2002/0046157 A1 | 4/2002 | Solomon | |
| 2002/0052540 A1 | 5/2002 | Iliff | |
| 2002/0069134 A1 | 6/2002 | Solomon | |
| 2002/0082818 A1 | 6/2002 | Ferguson et al. | |
| 2002/0082819 A1 | 6/2002 | Ferguson et al. | |
| 2002/0082820 A1 | 6/2002 | Ferguson et al. | |
| 2002/0082821 A1 | 6/2002 | Ferguson et al. | |
| 2002/0083146 A1 | 6/2002 | Ferguson et al. | |
| 2002/0107954 A1 | 8/2002 | Ferguson et al. | |
| 2003/0135514 A1 * | 7/2003 | Patel et al. | 707/102 |
| 2004/0153479 A1 * | 8/2004 | Mikesell et al. | 707/200 |

* cited by examiner

*Primary Examiner*—Don Wong
*Assistant Examiner*—Merilyn P Nguyen (57) ABSTRACT

A method and system for implementing storage strategies of a file autonomously of a user. At least some of the illustrative embodiments are methods comprising creating an electronic file in a computer system, creating metadata regarding the file (wherein the metadata defines at least in part data management preferences for the file), and implementing storage strategies for the file autonomously of a user of the file.

24 Claims, 4 Drawing Sheets

METHOD AND SYSTEM FOR IMPLEMENTING STORAGE STRATEGIES OF A FILE AUTONOMOUSLY OF A USER

BACKGROUND

Many computer systems, whether operated as stand-alone personal computers or as a server in an array of servers, may have some form of data storage devices for storing data long-term. In situations where data is stored and accessed on a regular basis, but where the reliability required of the data is relatively low, the data may be stored only on a single hard drive within the computer system. As the reliability required for the data increases, other storage mechanisms and hardware may be utilized to protect against data loss. One such mechanism may be storing the data on a Redundant Array of Independent Disks (RAID) system. If desired reliability of the data so warrants, a computer system user may also make backup copies of the data, possibly to magnetic tape based storage devices or to optically based storage devices.

There may also come a time in the life of data that, while it is still needed, access to the data may be relatively infrequent. In situations such as this, a user may be willing to sacrifice access speed for the older data in order to ensure that data more frequently used may be stored on higher bandwidth devices. In such situations, the older data may be stored to magnetic tape devices or optically based devices.

Managing data over its life cycle may be a labor-intensive task. While hard drives, hard drive systems, magnetic tape backup systems, and optically based systems may be available, each of these broad categories of devices may be islands of technology that may not communicate well with each other. In order to transition data from relatively short-term storage such as a hard drive to relatively long-term storage such as a magnetic tape or optically based system, an information technology specialist may be needed. This, and possibly other, factors may increase the cost of ownership of large computing resources to be four to eight times higher than the original cost of purchase of the hardware. Further, storage solutions may only operate on a large scale basis, e.g., on an entire hard drive or on an entire partition of a hard drive, rather than on a file-by-file basis.

SUMMARY

The problems noted above may be solved in large part by a method and system for implementing storage strategies of a file autonomously of a user. One exemplary embodiment may be a method comprising creating an electronic file in a computer system, creating metadata regarding the file (wherein the metadata defines at least in part data management preferences for the file), and implementing storage strategies for the file autonomously of a user of the file.

BRIEF DESCRIPTION OF THE DRAWINGS

For a detailed description of the embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to components by different names. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure. In addition, one skilled in the art will understand that the following description has broad application. The discussion of any embodiment is meant only to be exemplary of that embodiment, and not intended to intimate that the scope of the disclosure is limited to that embodiment.

The various embodiments of the invention were developed in the context of storing and controlling data over its life cycle (life cycle data management) using storage devices available at the time of the writing of the specification. The storage devices may comprise a single hard drive, multiple hard drives operated as "just a bunch of disks" (JBOD), multiple hard drives operated in a RAID system, magnetic tape systems, and optical storage systems such as compact disk read-only memories (CD ROM). However, the systems and methods described are not limited to use only with the specifically described storage devices. Other long-term storage devices that now exist, or that may be developed, may likewise be utilized in implementing the embodiments of the invention.

Figure 1:
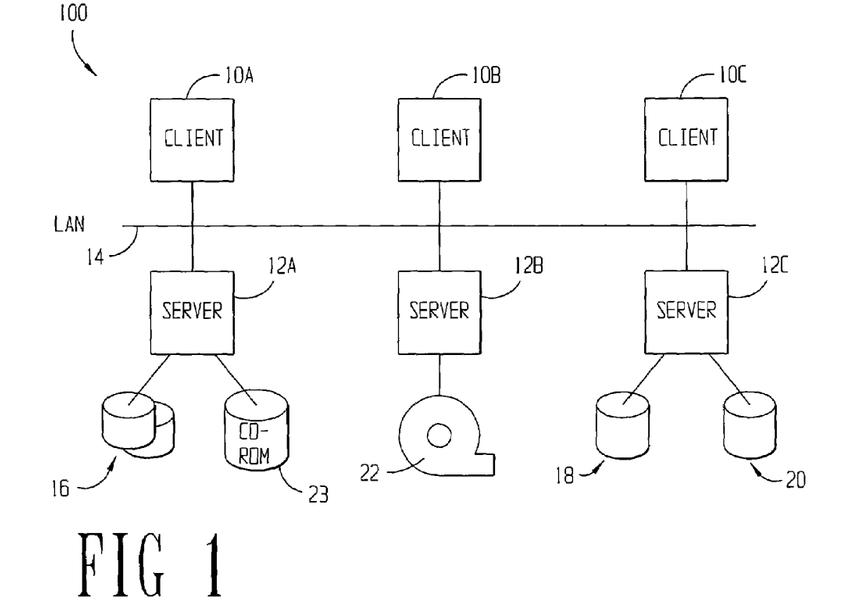
FIG. 1 illustrates a network system in accordance with embodiments of the invention.

FIG. 1 illustrates a network system 100 constructed in accordance with at least some embodiments of the invention. The network system may comprise a plurality of client computer systems 10, which may also be known as computer hosts, coupled to each other and to a plurality of servers 12 by way of a network, such as a local area network (LAN) 14. Each of the clients 10 may be stand-alone computer systems used by individuals, such as in an office environment where each work station has a computer coupled to a network, or the clients may be servers coupling the exemplary network system 10 to other networked devices. The clients 10 may communicate to each other or to the servers 12 by way of the LAN 14.

Each of the clients 10 may utilize programs that create and store data by communicating that data to network drives on one or more of the servers 12, such as drives 16, 18 and/or 20. The servers 12 and their attached storage devices, may present a unique virtual drive to each client 10 or 12. Actual data may be distributed across different storage devices depending on attributes and characteristics of the storage devices 16, 18, 20, 22 and 23, and the attributes assigned to each file. Consider, for purposes of explanation only, an electronic-mail (e-mail) client operating on client 10A. The e-mail client may provide a graphical user interface (GUI) for a user to view, create and delete electronic mail messages. If the client 10A is a stand-alone machine operated in a user's private residence, electronic mail messages may simply be stored on a hard drive within the computer system 10A. However, if the client 10A is operated in an office environment where electronic mail messages are stored on servers, the actual electronic mail messages may thus be stored on a network drive on one of the servers 12, e.g., the hard drives 16 of server 12A or the hard drives 18, 20 of server 12C. Depending on the combined user supplied attributes for the electronic mail messages and storage characteristics, the hard drive that stores the messages may be operated in a fault-tolerant mode, such as in a mirroring mode, or in some form of RAID system.

A network system constructed in accordance with embodiments of the invention may also have a low access speed, high volume storage device such as a magnetic tape storage system 22 coupled to server 12B. A magnetic tape system may provide daily or weekly backups for the data stored on any of the hard drives 16, 18, 20, or may be utilized to retrieve historical information that may not be stored on the hard drives 16, 18, 20. Likewise, a network system 100 constructed in accordance with at least some embodiments of the invention may also utilize a CD ROM 23. The CD ROM 23 may be used to access historical data, or to provide "snapshots" of the state of data at particular times during its life cycle.

The inventor of the present specification has identified five exemplary stages of the life cycle of data. The stages may be: creation; usage and growth; maturity; expiration; and perpetuity. The exemplary creation stage may be the point in time at which the data comes into existence in some form. Creation may be as simple as creating a new electronic-mail message or word processing document, or as complex as conglomerating disparate databases to create a new database containing specific information. The exemplary usage and growth category may be a period of time where data is accessed frequently, and the data may also change and/or grow in volume. The exemplary maturity category may be a time when growth of the data may diminish or cease, but accesses to that data may continue with some regularity. The final two exemplary categories, expiration and perpetuity, may be mutually exclusive for any particular data. That is, data may expire, at which time it may be deleted from a network system in its entirety. Alternatively, data may reach a point where it is seldom accessed, but its continued availability may be required, thereby implying its storage on lower bandwidth but high volume devices, such as magnetic tape backup systems.

Embodiments of the invention may abstract storage concerns and operations from the users and programs operating on the clients 10. More particularly, various embodiments of the invention may be directed to a plurality of software agents, and related software services, which provide data storage and retrieval across all the various storage devices, possibly transparent to the users and programs. Performing data storage in this manner may be referred to as abstracted storage or an abstracted storage system. To users and user programs, the abstracted storage may appear to be a network attached drive with a familiar directory structure. However, and as described more fully below, the abstracted storage system may apply different storage strategies on a file-by-file basis. The user and/or administrator may define attributes of a file (and therefore the data within the file) such as the security desired for a particular file, the desired reliability, data lifetime, and/or its access speed, and the abstracted storage system may implement a storage strategy to attempt to meet the criteria.

Figure 2:
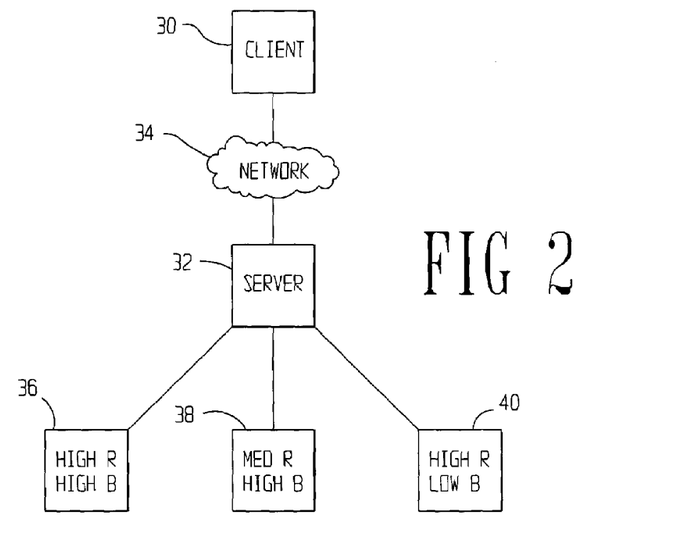
FIG. 2 illustrates a generic network system including storage devices having varying degrees of reliability and bandwidth.

Consider for purposes of explanation a generic network system as illustrated in FIG. 2. The generic system may comprise one or more clients 30 coupled to one or more servers 32 by way of a network 34. The server 32 may couple to storage devices 36, 38 and 40. Each of the storage devices may have differing reliabilities and access speeds or bandwidth. Exemplary storage device 36 may have high reliability (noted in FIG. 2 as "High R") and high bandwidth (noted in FIG. 2 as "High B"). Storage device 36 could be, for example, a series of hard drives operated in a RAID format, or some other high reliability, high bandwidth storage system that has yet to be developed. Storage device 38 may be a medium reliability device (noted in FIG. 2 as "Med R") and yet have a high bandwidth. Storage device 38 could be a single hard drive or array of hard drives operated as a JBOD, or some other storage device that has yet to be developed. The bandwidth or access speed for storing and retrieving information to the storage device 38 may rival that or be even better than the bandwidth or access speed for storing and retrieving information from the storage device 36, but its reliability may be significantly lower. Storage device 40 may be a high reliability, but low bandwidth (noted in FIG. 2 as "Low B") device, such as a magnetic tape device, or other devices yet to be developed. The point to be gleaned from the illustration of FIG. 2 is that the storage devices, depending on their technology, may have varying degrees of reliability and varying degrees of bandwidth or access speeds. Only three combinations are illustrated in FIG. 2, but any particular network system may have greater or fewer storage devices, and therefore greater or fewer reliabilities and bandwidths, which may be taken into consideration by the various embodiments of the invention.

In accordance with embodiments of the invention, when a file containing data is created in the user space, information about that file and/or data may likewise be created. Creation of information in this manner may be referred to as the creation of "metadata." For purposes of this specification, and in the claims, the combination of the data (possibly in a file format) and the metadata may be referred to as a data cell. In at least some embodiments, a user of the client machine 30 may create the metadata contemporaneously with creation of a new file in the user space. Alternatively, a user (or program) who creates the file may have no authority to assign the metadata; and rather, an administrator may set attributes which the system will use autonomously to create metadata. In yet other embodiments of the invention, creation of the metadata may be based in part on input from the user, and other portions of the metadata may be specified by an administrator.

Regardless of the precise mechanism by which the metadata is created, in at least some embodiments of the invention the metadata may comprise desired attributes of the storage such as the amount of security that should be attached with the file of the user space, the desired reliability of the data, the desired lifetime of the data, and an indication of a speed at which the data may need to be retrieved. Once a file of the user space is "saved" to a network drive, the client 30 (or the software operating thereon) may consider the transaction complete. However, the precise mechanism by which and where the data is stored may be dependent on the preferences set out in the metadata.

Thus, a user and/or administrator may define desired characteristics such as a reliability and access speed. Programs operating on a server, such as server 32 in the generic system of FIG. 2 (the precise nature of the programs which will be discussed more fully below) may read the metadata of the data cell and make a determination as to a storage solution that best fits the requirements set forth in the metadata. In order to devise a storage scheme, the storage characteristics of the storage devices may need to be determined. Each of the storage devices 36, 38, 40 may have the capability of providing an indication of their respective reliability and access speed. Software executing on the server 32 may scan the available storage devices, such as devices 36, 38 and 40 of FIG. 2, to determine their reliability and bandwidth. Although there may be many ways to quantify reliability and access speed, in at least some embodiments of the invention reliability may be expressed as a number representing the mean time between failures (MTBF) or an annualized failure rate (AFR). With regard to access speed, this may be quantitized as an amount of time between when a request is provided to the storage device, and when data begins to flow from the storage device based on the request. For an exemplary hard drive or RAID system, access time may be as low as three milliseconds. For magnetic tape based systems, access time may be three minutes or more.

Software on the server 32 may devise a storage solution for each data cell using one or a combination of the storage devices 36, 38, 40. If a user and/or administrator indicates a desire that the data be stored in a manner that is highly reliable, and also to which access may be made quickly, the software executing in server 32 may decide to store the data in the storage device 36, having high reliability and high bandwidth. In this exemplary system, if a user and/or administrator indicates that data needs to be highly reliable, but access to the data may be relatively slow, the software executing in the server 32 may store the data in storage device 40, defined for this example to have a high reliability and low bandwidth. If a user and/or administrator indicates a preference for data to have high bandwidth, but only medium reliability, the software executing in the server 32 may store the data in the storage device 38. The software executing in the server 32 may, in this medium reliability, high bandwidth example, also store the data on storage device 40 such that given a failure of the storage device 38, in whatever form the storage device may take, the data may be retrieved, albeit slower, by way of the storage device 40. Thus, not only may the software executing in the server 32 store the data on a single storage device or array of storage devices acting as a single device, but may also utilize the storage devices in combination to achieve, to the extent possible within any particular network system, the desired reliability and access speed indicated by the user and/or administrator. In situations where multiple copies of a data cell exist, the embodiments of the invention may also track location of each copy and ensure coherency.

Figure 3:
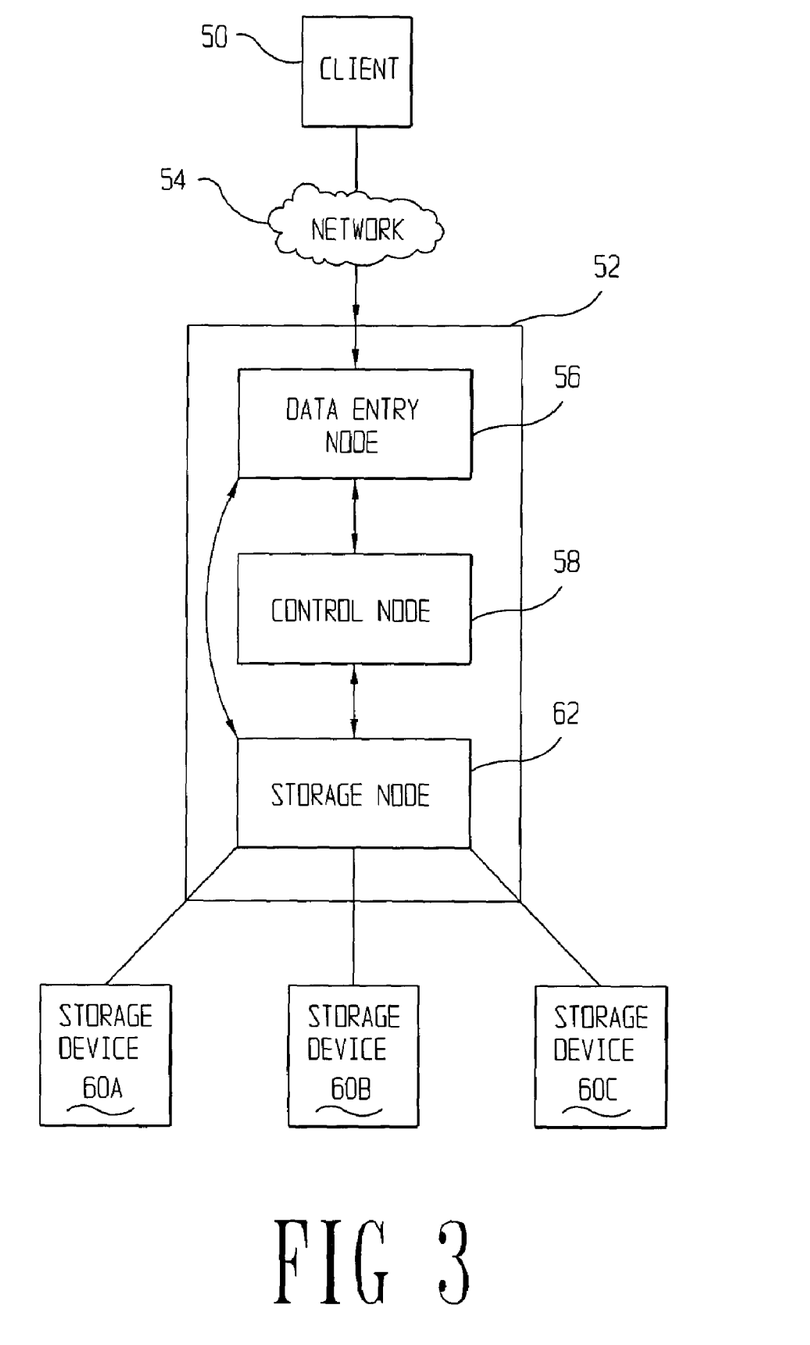
FIG. 3 illustrates various software components which may be utilized in accordance with embodiments of the invention.

FIG. 3 illustrates, in greater detail, exemplary high level software components which may be used to implement the abstracted data storage in accordance with embodiments of the invention. In particular, a client 50, which may be the same as client 30 of FIG. 2 and clients 10 of FIG. 1, may communicate with a server 52 or other network device by way of a communication network 54. At the software level, this communication may be to one or more programs categorized within a data entry node 56. Programs of the data entry node may perform tasks to ensure that as far as the client 50 is concerned, the communication appears to be to a network drive. That is, the programs of the data entry node 56 may be responsible for responding to communications from the client 50, and appearing to be a network attached network drive. In at least some embodiments of the invention, programs of the data entry node 56 may be responsible for creating the metadata associated with each file of the user space, and therefore the data cell. In this way, software programs which may be executed on the client 50 may utilize the abstracted data storage of the embodiments of the invention without requiring modification. Programs of the data entry node 56 may create the metadata based on previously provided preferences, either by a user, or possibly by an administrator providing default information. Regardless of the precise mechanism by which the specific preferences are communicated, the data entry node programs may thus create a data cell and pass the information to control node 58 category of programs.

In embodiments of the invention, programs of the control node 58 may be responsible for making a holistic or localized determination as to the storage scheme to be applied to a file which may be based, at least in part, on the preferences provided in the metadata. In particular, programs of the control node may read the preferences and make a determination as to which, or what combination, of storage devices 60 may be used to store the data cell. The storage node programs 62 may be responsible for scanning the storage devices 60 and creating a generalized storage characterization of each device. Accessing storage node programs 62 in this way allows the control node 58 to view all storage devices in the same manner regardless of the technology. The determination as to the desired storage solution may be based, in part, on programs of the control node polling or scanning each of the storage node 62 programs to determine each storage node's respective reliability and access speed. As was previously mentioned, storage devices in accordance with various embodiments of the invention may have the ability to provide an indication of the reliability (possibly as an MTBF or AFR), as well as access speed (possibly in terms of a time between receiving the request and transferring of the requested information). Thus, based on the desired reliability and access speed indicated in the metadata for a particular file, as well as the reliability and access speed of each of the storage devices 60, programs of the control node may make a determination as to the best storage device or storage devices 60 to use in storing the data cell. Once a determination has been made as to the storage device or storage devices to be used by the control node 58 and that information is passed to the data entry node 56, programs of the data entry node 56 may pass the data cell containing the data to programs of the storage node category of programs. Storage node programs may be responsible for reading and writing of the data cell to the appropriate storage devices 60.

Before proceeding, it should be understood that the illustration of FIG. 3 is merely to provide high level overview of various components of the software that may provide the abstraction of the storage devices away from the client 50. Programs in each node need not necessarily communicate only to other nodes in a direct line, but communications may also include communications directly between any of the categories (data entry, control and storage node), and may also include communications between programs within any of the particular nodes. It should also be understood that the three broad categories of software to perform the abstraction of the data storage should not be read to require any definitive structure for the programs that perform the abstraction of the storage. These three divisions are discussed only to aid in conceptualizing operation of the various embodiments of the invention. Performing the tasks generally delineated by programs within the three nodes may be accomplished by a combination of programs operating as agents and programs performing services.

The degree of autonomy and intelligence of a software agent may vary. Some agents may be purely reactive agents, performing their tasks only in response to messages received. Other agents may be highly intelligent, which means they may be proactive in performing their assigned tasks, and these agents may be able to learn from their environment, and may be able to communicate with other agents and/or services to perform the desired task. In accordance with embodiments of the present invention, the agents may be categorized into the three nodes discussed above, and may be intelligent agents capable of the autonomous, proactive and social interactions. At least some of the agents utilized in the embodiments of the invention have internal goals, they may plan for the future and future events, and may communicate with each other regarding the internal goals and future plans to implement those goals and plans. The agents of the various embodiments may communicate by way of exchanging messages, such as message encoded using the agent's communication language (ACL). While ACL may be the preferred mechanism for facilitating communications among agents (and services), other communication mechanisms may be equivalently used.

Various embodiments of the invention may also utilize programs providing services to perform specific tasks. In particular, agents may make decisions regarding how to proceed in implementing the abstracted storage system of the various embodiments, and these agents may rely on service programs (or services) to perform specific tasks. In this way, the services may be less intelligent and/or less autonomous than the agents. The services, however, may have more intelligence than a merely reactive agents.

Figure 4:
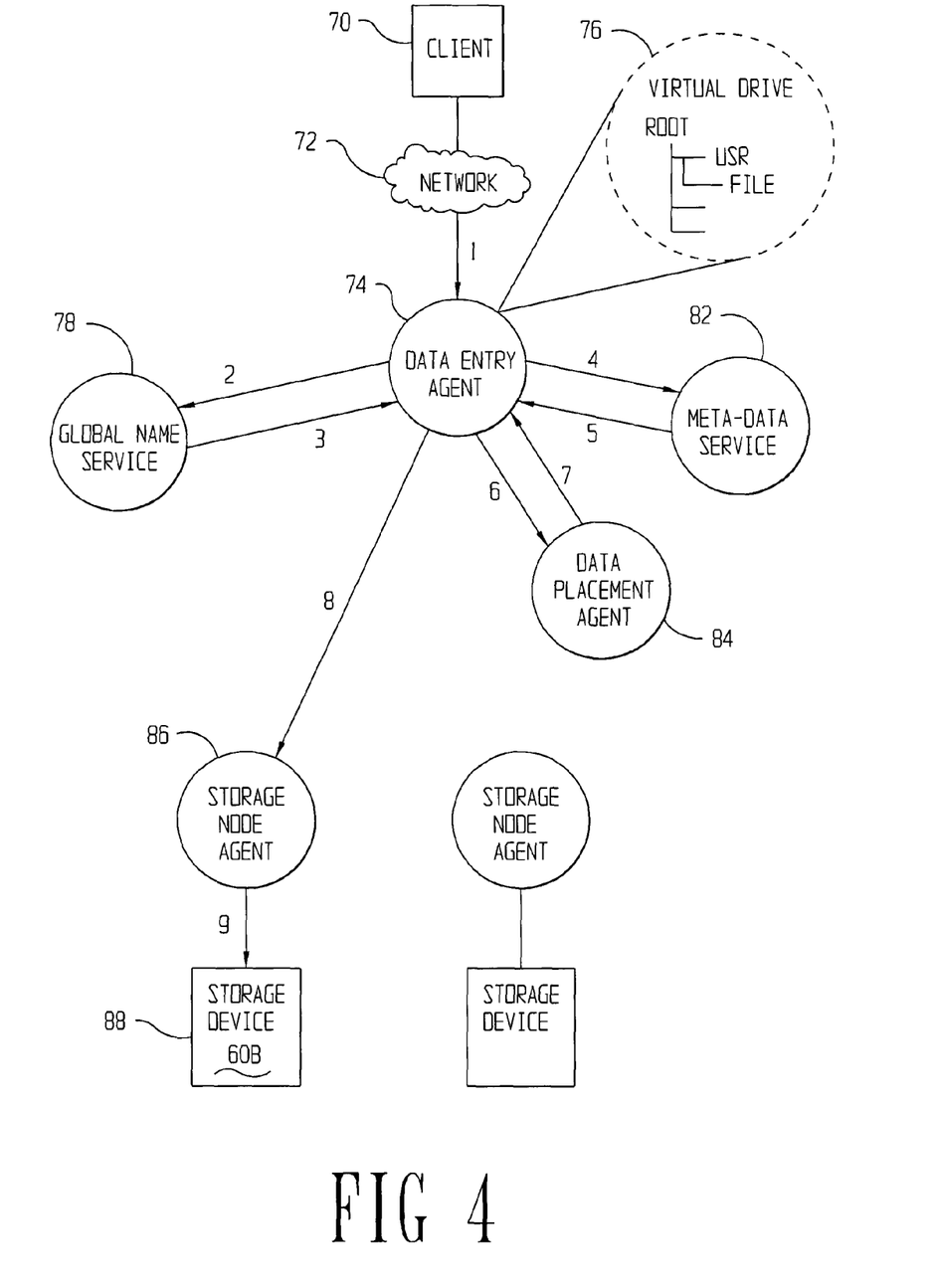
FIG. 4 illustrates an exemplary creation and storage of a file in the abstracted storage system in accordance with embodiments of the invention.

FIG. 4 illustrates an exemplary creation and storage of data in accordance with embodiments of the invention. FIG. 4 also illustrates interaction of various agents and services in accomplishing certain aspects of the abstracted storage. In particular, a client 70, which may be the same as clients 10, client 30 or client 50, may access an abstracted network drive over a network 72. The client device may write the user space file containing data to the data entry agent 74 (this being the first step in the process as indicated by the number 1 next to the arrow extending between the client 70 and the data entry agent 74). The client 70 may appear to be storing the file on a network drive in a user namespace and in a user file structure. The appearance of storage to a network drive may be illustrated in FIG. 4 by the exemplary file structure in the dashed circle 76. Thus, the client 70 (whether a program or a user) may simply store the file at a location using a name and convention that may remain unchanged from systems in which storage is not abstracted. However, in order to implement the functionality of the embodiments of the invention, the file containing the data may not be stored in the abstracted storage system under the same name or in the same directory structure as the file is given by the client 70.

In order to determine a globally unique name for the user space file to implement the abstracted data storage, the data entry agent 74 may call on a global name service 78 (step 2). The global name service 78 may convert from the user's namespace exemplified by the virtual drive 76 into the global namespace. The globally unique name may be returned to the data entry agent 74 (step 3). Thereafter, the data entry agent 74 may call on a metadata service 82 (step 4). The metadata service 82 may combine the user's metadata (if any) with metadata provided by an administrator to create an overall metadata set, and then combine the metadata set with the user space file to create the data cell. Once created, the data cell may be passed back to the data entry agent 74 (step 5).

At this point in the exemplary process, the client 70 has written a user space file containing the data to the data entry agent 74. The name of the file has been converted from the user namespace to the global namespace, and the metadata regarding the file has been created and combined to create the data cell. The next step in the exemplary process may be a determination, possibly using aspects of the metadata, the particular storage scheme for the data cell. The data entry agent 74 may call (step 6) a data placement agent 84 to determine in which storage device or storage devices the data cell may be stored to implement the desired reliability and access speed. In particular, the data placement agent 84 may, upon receiving metadata, scan the storage devices of the particular network system to determine the range of reliabilities and access speeds. Directories may be constructed to contain information about capabilities of storage node that may eliminate excess querying of the storage nodes. Using the desired reliability and access speed from the metadata associated with the data cell, and the reliabilities and access speeds of the storage devices of the particular network system, the data placement agent 84 may make a determination as to which of the storage node or nodes may be used to achieve, as close as possible, the desired reliability and access speed. The data placement agent 84 may pass this information back to the data entry agent 74 (step 7). Based on the decisions made by the data placement agent 84, the data entry agent 74 may send the data cell to a storage node agent or agents (step 8) that may be associated with the desired storage device. The storage agent 86 may thus take the information and write it to its attached storage device 88. While FIG. 4 shows that the exemplary data cell is written only to one storage device 88, if the desired reliability or access speed dictated such, the data placement agent 84 may recommend that the data cell be stored on multiple storage devices, for example one copy on a hard drive and a backup copy on a magnetic tape device or optically based system.

The agents, services, devices and particular order of the steps illustrated in FIG. 4 is merely exemplary. Many of the steps may be performed in a different order without adversely impacting the overall goal of operating an abstracted storage system. Further, certain steps may be added or deleted without departing from the scope and spirit of the invention. For example, the globally unique name assigned to a user space file may be based on the ultimate storage location of that file. Thus, the metadata service 82 and data placement agent service 84 may run prior to the data entry agent 74 calling the global naming service 78. Further, while each of the agents is exemplified by a single entry in the figure, each of the tasks performed by the agents and services may, in some embodiments, be accomplished by a plurality of agents and/or services operating together and on separate devices.

Still referring to FIG. 4, having now described creation and storage of a user space file, accessing of an existing data cell may be discussed. In this exemplary situation, the client 70 may access the virtual drive 76 across the network 72. The data entry agent 74 may provide the virtual drive 76 from which an existing user space file may be selected. Once selected, the data entry agent 74 may access the global name service 78 to determine the globally unique name for the data cell corresponding to the user space file. Therefore, the data entry agent may access the appropriate storage node agent to obtain a copy of the file. The virtual mount point only gives the client 70 access to data stored on that particular virtual drive. Embodiments of the invention support a query interface that the client or program running on client 70 can send to data entry point 74. Based upon client 70 access permissions all of the data stored in the abstracted storage system can be searched. The results of the query could be a list of links to other virtual mount points that may give client 70 access to the data.

The specification to this point has focused mainly on a user and/or administrator providing information regarding desired reliability and access speed for each new data cell created. There may be other characteristics of the data cell created containing data which may be specified by a user and/or administrator. Some of these additional characteristics may be the level of security to be applied to the data cell and its lifetime. As far as security, a user may specify security features as simple as who may have access, to as complex as providing encryption of the data to ensure that only those authorized or having the necessary decryption key may view the information. With regard to lifetime, a user and/or administrator may define a point in the future at which the data cell may be deleted, possibly under a document retention and control policy that may be implemented by the abstracted storage system of the embodiments of the invention. In order to implement these features, as well as the features discussed above, the inventor of the present specification has identified a number of agents and services, utilized by the agents, to implement the functionality of an abstracted storage system. That these groups are merely exemplary, and the tasks that may be performed by any of these agents or services may be combined or separated to have greater or fewer agents and/or services to perform the overall functions.

Accounting Agents

Accounting agents may be the primary reporting mechanism for standard accounting functions on parameters such as storage capacity, usage, performance, and errors encountered in the storage devices. There may be multiple accounting agents, possibly each agent tracking one or more parameters of the network system. Depending on administrator defined requirements, specifically in the area of reliability, there may be one or multiple agents of the same type. Multiple agents may collaborate to make decisions according to their responsibilities. Auditing agents, as part of the accounting agent category of agents, may be responsible for checking for trends of parameters of the network system as possibly specified by an administrator. For example, the auditing agents may monitor storage capacity usage for each user of a network system. The auditing agents may have the intelligence and capability to use data collected by other agents, such as the accounting agents. The auditing agents may use information gathered on their own, or gathered by communication with other agents, to generate reports on characteristics and parameters of the network system. The auditing agents may generally fall within the control node category of agents (FIG. 3). The accounting agents may be responsible for collection of information and parameters from different agents and services in the network system.

Capacity Agents

Capacity agents may be responsible for freeing capacity at the global level, such as by rearranging storage schemes to increase storage capacity. The capacity agents may be responsible for providing capacity information to the data entry agents (discussed more fully below). Thus, before a data cell may be stored, one or more capacity agents may make a determination as to whether sufficient space exists on the target storage nodes. For example, the data placement agent 84 may determine that a data cell should be stored on two different storage nodes, possibly for data reliability purposes. The data entry agent 74 may thus communicate with multiple capacity agents, one each associated with each storage node. The capacity agents may inform the data entry agent whether sufficient storage exists on the specific target storage node. The capacity agents may comprise specific capacity agents such as RAID capacity agents, robotic system capacity agents, and tape capacity agents.

Data Entry Agents

The data entry agents may be responsible for providing the abstraction between a user and the internal workings of an abstracted storage system that provides autonomous life cycle management of the data. Life cycle data management, however, may happen at the control nodes and not the data entry node. As discussed with respect to FIG. 4, a data entry agent may be responsible for appearing to be a network drive for storage and retrieval of files containing data in the user's namespace. Data entry agents may further be responsible for invoking other agents and services to perform abstracted data storage in accordance with embodiments of the invention. In at least some embodiments of the invention, data entry agents may also provide an application programming interface (API) that may allow external users to query the data storage repository and restore past versions of data.

Data Expiration Agents

Data expiration agents may be responsible for monitoring data within the abstracted storage system for expiration. Each file created and stored in the abstracted data storage system of the various embodiments may have associated therewith metadata that may comprise an expiration date, after which the file containing data may be removed or made less accessible. Thus, the data expiration agents may provide long-term file deletion services. The data expiration agents may also, by tracking expiration dates of the files containing data within the abstracted data storage system, provide a network administrator with reports (possibly through the accounting agents) on future planned deletions, and therefore future capacity of the overall abstracted data storage system. The data expiration agents may thus send deletion commands to other more specific agents. The data expiration agents may support multiple expiration types, e.g., number of days from creation, deletion at a particular date, and deletion based on overall capacity of the abstracted storage system. The data expiration agents may also support multiple types of deletions, such as merely deleting a file name from the directory structure (but leaving the data resident on the disk), and deleting the name from the directory structure and also overwriting the data (such that it may not be recovered using recovery mechanisms).

The data expiration agents may also keep track of and inform the administrator that backup copies of data, possibly in offsite storage, may have expired and require deletion. Thus, the data expiration agents may notify an administrator that a data cartridge (possibly identified by a barcode label), stored at an offsite location may need to be returned to the system such that the particular files, or possibly an entire cartridge, may be deleted. The data expiration agents may comprise high level agents, as well as low level agents, such as agents monitoring at the storage node level.

Data Mining Agents

The data mining agents may be query engines responsible for querying databases within the abstracted storage system and returning results to a user. As an example only, consider a database containing metadata for the data cells within an abstracted storage system. A user may be attempting to locate data cells created on a particular day, and thus may query the metadata to obtain a list with criteria specified. The data mining agents may generally fall within the control node category of agents.

Data Placement Agents

The data placement agents may be responsible for working with the data entry agents and storage node agents (discussed below) to determine a suitable storage location for each data cell. Determining a suitable location for the storage of each data cell may comprise many considerations, such as costs/benefit analysis, attributes of the data supplied by a user, attributes of data supplied by an administrator, current status of the overall abstracted storage system, and other information learned by intelligent agents within the system with which the data placement agent communicates. The data placement agent may make high level decisions regarding data cell placement, with low level decisions regarding data cell placement may be made by the data placement node agent (discussed immediately below).

Data Placement Node Agents

The data placement node agents may be responsible for determining suitable and/or optimal placement for a data cell at the storage node level. A storage node may have multiple storage devices of the same type. In alternative embodiments, storage nodes may have multiple storage devices, e.g., a hard drive in series with a tape library may be supported by a single storage node, with the characteristics being a composite of both storage devices. The data placement node agents may thus determine a suitable storage scheme with regard to the storage device coupled to a particular storage node.

Data Protection Agents

As alluded to above, one of the features of the abstracted storage system of the embodiments of the invention may be an ability to perform varying degrees of data protection based on desires set forth in the metadata by a user and/or the administrator. The data protection agents may thus be responsible for monitoring and guiding data protection across the entire abstracted storage system. The data protection agents may thus use information provided by the user and/or administrator, along with information gathered from one or more nodal data protection agents, to determine data protection policies across the abstracted storage system. These data protection policies may comprise limiting access to particular data cells, encryption of varying degrees of strength, and implementing multiple levels of encryption (e.g., software level, hardware level). Data protection agents may be both global and local in scope. Local operation within a storage node may be concerned with actions such as cloning, snapshot and replication. Global data protection agents may orchestrate the operations of the local agents.

Diagnostic Agents

The global diagnostic agents may coordinate failure analysis across the entire abstracted storage system. Locating a failure may require that multiple components, agents and services may be part of the diagnostic process. Each machine may conduct diagnostics using local diagnostic agents. In addition, logs may be created in order to look at what was happening before the failure. Global diagnostic agents may analyze data generated at the local or node level. Moreover, diagnostics may be performed at the data level and at the hardware level. Failures may be failed hardware components (network, computer or storage) or agent related (a data cell may be misplaced or incorrectly stored).

The diagnostic agents may be assisted by one or more specific diagnostic agents such as a network diagnostic agent, a RAID diagnostic agent, a robotic diagnostic agent and a tape diagnostic agent. As the names of each of these sub-agents may imply, these additional agents may be responsible for predictive failure analysis and monitoring of specific portions of the abstracted storage system. All of the diagnostic agents may fall generally within the control node category of agents.

Disaster Recovery Agents

In the event of a catastrophic data loss, the disaster recovery agents may be responsible for taking the necessary steps, and invoking other agents and services, to recover (to the extent possible) from the disaster. Recovery may involve restoring user and system data from tape drives, CD ROMs, and/or other devices not affected by the particular disaster. The disaster recovery agents may also be responsible for restoring state, databases, and learned knowledge of the agents in the abstracted storage system. The disaster recovery agents may utilize sub-agents such as a nodal data recovery agent (responsible for data recovery on a storage node) and a system disaster recovery agent (possibly responsible for recovering system-specific information such as the states and learned knowledge of the agents). System disaster recovery agents may be responsible for reconstructing the agents and services in the event a hardware and/or software failure removes some portion of the operational components of the life cycle data management system.

Fault Tolerance Agents

In accordance with at least some embodiments of the invention, a network system utilizing the abstracted storage system may have a plurality of servers hosting various types of storage devices. This construction, in and of itself, may present some fault tolerance. However, various embodiments of the invention may also utilize the fault tolerance agents, possibly in combination with the data protection agent, to make decisions and take action to create a more fault tolerant abstracted storage system. Fault tolerance agents may monitor other agents for proper operation. If a hardware component containing agents fails, fault tolerance agents may detect the failure. The fault tolerance agent may spawn another agent on another machine to replace the failed agent. Once the new agent is created, it may be necessary to set its internal "mental" state and prior knowledge (agents learn as time progresses). Data fault tolerance is obtained by replicating the data and metadata. The fault tolerance agents may work in conjunction with network or device-specific fault tolerance agents, such as a network fault tolerance agent, a robotics fault tolerance agent, a RAID fault tolerance agent, and a tape fault tolerance agent.

Obsolescence Agents

As time progresses, some storage devices, while still operational, may become obsolete. This obsolescence may present difficulties such as obtaining media upon which to write data, or drives to read the media previously written. The obsolescence agent may thus be responsible for monitoring the type of hardware embodied in each of the storage devices and noting to a system administrator when those devices have become obsolete. This determination may possibly be made by monitoring a globally accessible website that lists hardware that is nearing or has become obsolete. An administrator may set an obsolescence-risk-threshold which may determine when agents migrate data from storage nodes with aging hardware to other storage nodes. Obsolescence agents, along with the data placement agents, may be responsible for migrating data from the obsolete equipment to other storage devices and notifying the system administrator of these potential problems.

Performance Agents

Many of the agents discussed, or that will be discussed, may reside on particular servers within the network system.

For example, it is anticipated that there may exist a data entry agent for each network connection of a server. Likewise, storage node agents for particular storage devices may reside on the server to which the storage device attaches. However, other agents, generally the agents in the control node category, may perform their monitoring and decision-making processes regardless of where they may be executed. Thus, embodiments of the invention may monitor server loading, and when needed balance workload by relocating agents to other servers that may be more lightly loaded. The balancing may be purely from a workload standpoint, but more likely is in relation to assuring user data read and write speeds. The performance agents may thus be responsible for monitoring workload on each of the servers that define the abstracted storage system network. The performance monitored and corrective actions taken need not necessarily be limited only to server loading, and may also comprise migration of data from storage node to storage node (if the hardware of the system so allows), reconfiguration of system hardware, replication of services and agents in different locations, monitoring, and taking corrective action regarding network performance.

Provisioning Agents

The provisioning agents may be responsible for coordinating and collaborating storage within the abstracted storage system. The provisioning agents may collaborate with the data placement and capacity agents to perform their overall task. Additionally, the provisioning agents may rely on more specific agents, such as a RAID provisioning agent, a tape provisioning agents, and/or a robotic provisioning agent in order to determine an amount of storage that may be now required or needed in the future.

Storage Node Agents

The storage node agent may be the main repository of storage characteristics about a specific storage device. As discussed with respect to the illustration of FIG. 4, storage node agents may be responsible for accepting data cells and storing the data cells on the storage device to which the storage node is associated. Thus, if the storage device is a RAID system, the storage node agent may be responsible for performing RAID-type reads and writes, as well as data recovery and rebuilding of replaced drives and the like. The storage node agents may provide a consistent API or interface to the storage device regardless of the technology.

Master Agents

When an abstracted storage system is being installed, servers that are going to be used to create the system may have a master agent and a few associated services installed. The master agents may thus present centralized control for downloading agents and services to each server. The master agent may monitor the status of the local machine it is controlling and report to a global master agent or agents. The master agent may also be responsible for starting, stopping and monitoring agents that are running on its server. Moreover, when starting an agent, the master agent may initialize the new agent. Starting a new agent may be as simple as using default values or as involved as working with disaster recover agents to load learned knowledge and mental states.

Security Agents

Security agents may deal with protecting data from people without appropriate access rights, and from malicious software, such as a virus. Thus, security agents may perform tasks such as scanning data cells for virus programs, and checking authorizations of users desiring access to data cells stored within the system.

Having discussed an exemplary set of agents, the focus of the specification now turns to discussion of an exemplary set of services which may be used by those agents. The services discussed are merely exemplary. Greater or fewer number of services may be utilized, and their functions may be combined or split without departing from the scope and spirit of the invention.

Accounting Services

Agents may perform the intelligent functions in managing data. Services may perform the actual work defined by the agents. Thus, the accounting service may perform specific tasks to gather data and information that may be passed to the accounting agents.

Audit Services

Audit services may execute a command from an agent (possibly the audit agent) and gather the appropriate information to satisfy the command. The deliverable of such a task may be a report.

Published Subscribed Services

Agents and services in an abstracted storage system in accordance with embodiments of the invention may register with the publish subscribe service once granted access to the system. An agent may use the publish subscribe service to issue a command to a single service or group of services, possibly using ACL. Once issued, the agent need not be concerned with the details of delivery of the command. Stated otherwise, publish subscribe service may provide asynchronous communication among agents and services in an abstracted storage system.

Global Anti-Virus Services

The global anti-virus services may be responsible for performing anti-virus functions at the global level. This may comprise ensuring operation of specific nodal anti-virus services (discussed below), and keeping track of updates to known viruses. During an attack, the global anti-virus services may monitor the attack at a global or system level. Commands may be issued to local nodal virus agents to identify, halt and/or contain the spread of the virus. Once the virus has been contained, the global anti-virus services may initiate repair and damage assessment, and report results to the administrator.

Nodal Anti-Virus Services

The nodal anti-virus services may be responsible for implementing anti-virus protection at specific storage nodes. Thus, for an exemplary RAID storage device, dedicated nodal anti-virus services may be responsible for scanning of the various data files and programs to ensure that problems associated with virus infections are reduced. The nodal anti-virus services may receive commands from the global anti-virus services to perform tasks such as halting processes and quarantining data cells. Further, in support of damage assessment, the nodal anti-virus service may report the condition of the local node, including data, services and agents.

Attribute Services

Attribute services may be responsible for delivery of metadata from a data cell to requesting agents and services. When data is within the usage and growth phase, the attribute services may maintain the metadata directories for faster access and retrieval. As the data passes to the maturity stage, the attribute services may not maintain copies of the metadata separate from the data cell.

Data Cell Cache Services

Data cell cache services may cache data cells at each storage node for the purpose of maintaining fast access time, especially for data in the usage and growth stage.

Namespace Cache Services

The purpose of namespace cache services may be to store location, global names and user name information at each data entry node. Storage of information in this manner may eliminate the need for the data entry node to go to the global name service once the data cell has been created and its path defined. If the data cell is moved by other means, then the path would be in error and the data entry node would have to go back to the global name service to find the current path.

Compression Services

The compression services may be responsible for performing data compression for storage. Compressing data prior to storage may give higher effective storage volumes, but may reduce access times for that data. Thus, the compression services may be selectively used when a user and/or administrator indicates a willingness to accept slightly slower access time, and where storage limitations may require such action. If data can be compressed at the point where it is created then less bits have to be transmitted through a network and less bits have to be stored in a storage device. The compression services may keep a database of compression algorithms and supply them to other services responsible for moving data, like the data entry node and storage node.

Data Mover Services

The data mover services may be responsible for actual moving and/or relocation of data. This may be a relocation within the same storage device, or across multiple storage devices. In the event that files and/or data may be stored in multiple locations, the data mover services may be responsible for atomic transactions, meaning that the operation must complete successfully. If not, the system is put back to a state before the transaction was attempted.

Deletion Services

The deletion services may be responsible for the actual deletion of files from the various storage devices. The various deletion agents may call on the deletion services to perform these tasks. Deletion may be controlled by the administrator and/or user through attributes in the metadata. Deletion can be by removing a data link, or by clearing and sanitizing standards like DoD 5220.22-M to help ensure that the any residue of the original data is removed from the storage media. Deletion may be complete or limited based on dates and version numbers.

Replication Services

Replication services may deal with data cell and block level replication issues. Replication services may include snapshots and clones of data, as well as incremental and differential backups, possibly to tape drive mechanisms. Snapshots and clones may cause all data cells on a particular storage device to be copied and updated in the global namespace. An abstracted storage system in accordance with embodiments of the invention may manage data at the data cell level, directory level or at the volume level. If a clone of a drive is taken then all of the data cells would be cloned regardless of whether their attributes required it. When this occurs, the global naming service may be updated.

Restore Services

Restore services may be responsible for handling both data cells and service cells. Service cells may contain information about the abstracted storage system. Information such as directory structures, agent stored knowledge, and topology information may be stored in system cells. To the agents that manage service cells, they may be no different than data cells except that they may contain system information. The restore services may be responsible for invoking other agents and services as necessary to restore data cells and service cells.

Version Control Services

Version control services may be responsible for tracking version numbers of data cells. Thus, other agents and services may call on the version control services for determining, for example, the latest version number of a file, or determining a number of versions that exist for a particular file.

Configuration Services

Configuration services may monitor and store the configuration of systems within the invention. This may comprise server model and serial number, the number and type of host bus adapter cards. Furthermore, the number and type of agents and services may be stored as well. There are several similar services that may share the same directory to store their data such as the configuration services, version control services, and topology services. Small abstracted storage systems may combine all services into one database or directory.

Global Namespace Services

As discussed with respect to FIG. 4, the global namespace services may be responsible for converting file names from a user namespace into a globally unique file name for each data cell in the abstracted storage system.

Topology Services

The topology services may provide a view of the abstracted storage system with respect to interconnections of hardware. For example, FIGS. 1, 2 and 5 may depict different topologies. During initial deployment of an abstracted storage system, master agents may need to know their local neighbors. Some large topologies may be hierarchical instead of peer-peer (FIG. 1 illustrates a peer-to-peer topology). In hierarchical systems the master agent may be connected to another server and not to a storage device. In this case, the master agent at the top of the hierarchy may be responsible for distributing agents and services to servers lower in the hierarchy. During normal operations, the topology services allow agents to know the location of other system components. Many agents need to know location and topology in order to support agent mobility (moving agents to another machine), disaster recovery, and data protection.

Data Cell Locking Services

Data cell locking services may exist at the data entry node and storage node. At the data entry node, data cell locking may support the users virtual namespace. Data cell locks may protect multiple writes on the same data cell from occurring at the same time. The lock may be limited in scope to a data cell and the virtual namespace. When the locking service is running on a storage node, then the lock may affect a data cell and its metadata. The lock at the storage node may affect the entire global namespace, and not just the virtual drive as is the case of locking at the data entry node.

Global Logging Services

Global logging services may be a mechanism to monitor behavior and diagnose problems in abstracted storage systems. Global logging services may control nodal or local logging services. The global logging service may send commands to the nodal logging services to monitor agents, services, variables, or events across the entire abstracted storage system. Moreover, the global logging services may be responsible for combining the results from a diagnosis or monitoring from local nodes.

Nodal Logging Services

Nodal logging services may reside on any node (control, data entry or storage node). In one embodiment, a local logging service may be installed in every node in an abstracted storage system. Local logging services may receive commands from the global logging service, then reconfigure itself to log the variables or events designated by the global logging service. At the completion of a monitoring run or when a predefined event occurs, a nodal logging service may log the data, notify the global logging service, and prepare the data for the global logging service.

Data Mining Services

Data mining services may be responsible for performing data analysis. Data mining services receive request from agents and translate them into queries. Data mining can be across internal abstracted storage directories and databases, or on databases maintained within the abstracted storage that support a specific users data, e.g., medical and insurance databases. Results from queries may be given back to requesting agent. Application specific databases maintained within the invention must adhere to the common database architecture defined by the invention.

Agents may communicate and collaborate with other agents in performing their appointed tasks. Likewise, agents may communicate with one or more services to accomplish their appointed tasks. Moreover, services may communicate to and collaborate with other services in performing their specific tasks. The appendix to this specification contains three tables that illustrate collaboration between agents, agents to services, and services to services. In particular, Table 1 of the attached appendix illustrates agents (along the top of the table) to service (listed down the left side) collaboration. In Table 1, and all the tables, "X" in the cell that intersects two entries indicates that those agents and/or services communicate and collaborate in the performance of tasks. Table 1, for example, indicates that the data expiration agent may rely on the accounting services, the audit services, the published subscribed services, the nodal anti-virus services, the attribute services, the deletion services, the version control services, the global namespace services, and the file locking services. Stated otherwise, the data expiration agent in accordance with embodiments of the invention may communicate to and collaborate with these various services in the commissioning of its appointed task of monitoring for expired data, and deleting expired data as necessary. The amount or strength of collaboration may vary greatly depending on the types of storage devices in the abstracted storage system, types of agents/services, and the attributes set by the administrator. These tables are examples and not definitive of how any particular system will negotiate its collaboration.

Table 2 illustrates the collaboration between agents, listing agents down the left column, as well as agents across the top. Just as in Table 1, collaboration or communication between agents is illustrated by an "X" placed in the intersecting cells. For purposes of illustration, the exemplary data expiration agent will be discussed; however, the table contains collaboration information for each of the exemplary agents in the embodiments of the invention. Thus, Table 2 illustrates that the data expiration agent may communicate to and collaborate with the capacity agent, the data expiration agent, the obsolescence agent, the provisioning agent, the security agent, and the storage node agent. Inasmuch as the storage node agents may be responsible for the ultimate communication to the storage devices, Table 2 illustrates that every agent in accordance with embodiments of the invention communicates to the storage node agents to fulfill its appointed tasks.

Table 3 illustrates the collaboration between services. As may be generally surmised from Table 3, the amount of collaboration between services is not as significant as the agent to service or agent to agent collaboration. However, there is some collaboration between services in accordance with embodiments of the invention. For purposes of illustration, the deletion services are discussed; however, Table 3 contains information regarding collaboration for all the exemplary services. Deletion services may thus collaborate with the published subscribed services, and the data cell caching services.

Figure 5:
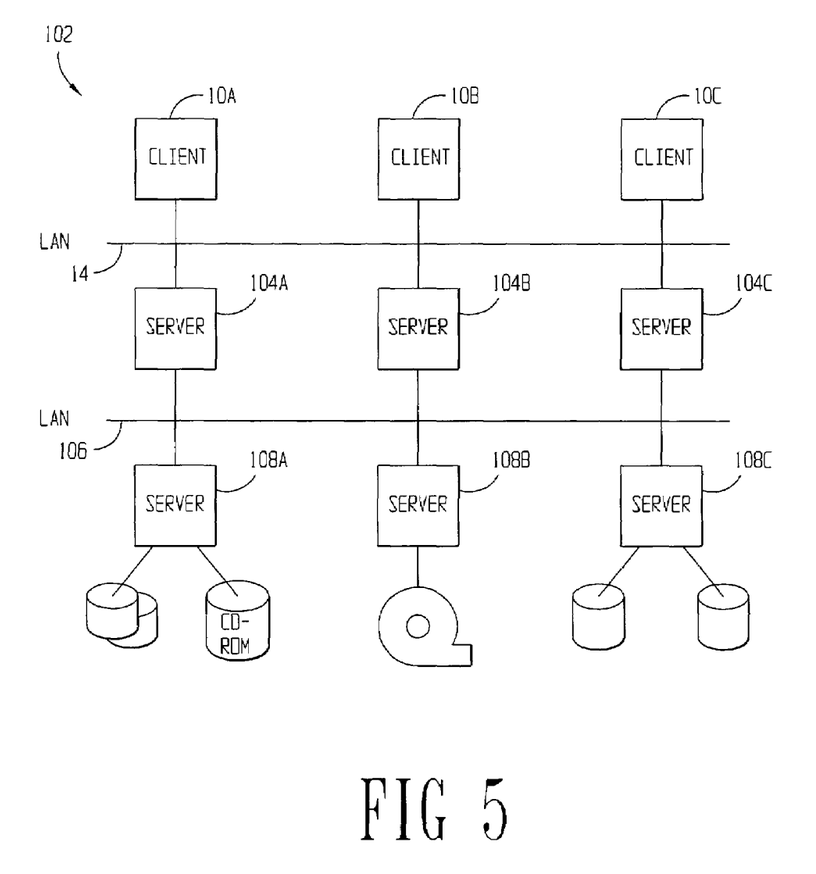
FIG. 5 illustrates an alternative network system in accordance with embodiments of the invention.

Referring again to FIG. 1, the clients 10 may communicate to the various software components operating in the servers 12 over the LAN 14. Because of the collaboration between agents and/or services, these agents and services may likewise communicate to each other over the LAN 14 when the target of their communication resides in a different server 12. Thus, in an exemplary system such as network system 100, the LAN 14 may carry both client communications as well as abstracted storage system communications. In circumstances where high client traffic is likely, the exemplary network system 100 of FIG. 1 may not be an optimum hardware solution. FIG. 5 illustrates a network system 102 in accordance with alternative embodiments of the invention. Network system 102 may comprise a plurality of clients 10 coupled to a plurality of servers 104 by way of a LAN 14. In these embodiments of the invention, the clients may communicate with each other and to the abstracted storage system over the LAN 14. In contrast to the network system 100 of FIG. 1, in the embodiments of the invention illustrated in FIG. 102, communications between agents and services may take place over a LAN 106 such that the ACL based messages exchanged between agents and services may not hinder communications on LAN 14. Additionally, autonomous movement of data cells over LAN 106 may not consume bandwidth on LAN 14. In embodiments such as that illustrated in FIG. 5, the data entry agents may reside on each server 104 to provide the mount points for the users and programs operating on clients 10. In contrast to the prior embodiments, the storage node agents may reside and execute on the servers 108. The control node agents may reside in any convenient location, and in fact may be periodically relocated from server to server in the group of servers 104, 108.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

Appendix of Tables

TABLE 1

|  | Accounting | Capacity | Data Entry Node | Data Expiration | Data Mining | Data Placement | Data Protection | Diagnostic | Disaster Recovery |
|---|---|---|---|---|---|---|---|---|---|
| Accounting Service | X | X | X | X | X | X | X | X | X |
| Audit Service | X | X | X | X | X | X | X | X | X |
| Publish subscribe service | X | X | X | X | X | X | X | X | X |
| Global Antivirus service | X |  | X |  |  | X | X |  | X |
| Nodal Antivirus service |  |  |  | X |  | X | X |  |  |
| Attribute service | X | X | X | X | X | X | X |  |  |
| Data cell cache |  |  | X |  |  |  |  |  |  |
| Name space cache service | X |  | X |  |  |  |  |  |  |
| Compression service |  | X | X |  |  |  |  |  |  |
| Data mover service | X |  | X |  |  | X | X |  | X |
| Deletion service | X | X |  | X |  |  |  |  |  |
| Replication service | X | X | X |  |  | X | X |  |  |
| Restore service | X | X | X |  |  |  |  |  |  |
| Version control service | X |  |  | X | X |  | X |  | X |
| Configuration service | X | X |  |  |  |  |  | X | X |
| Globalname space service | X |  | X | X | X | X | X |  | X |
| Topology service | X |  |  |  |  | X | X |  | X |
| File locking service |  |  | X | X |  | X | X |  |  |
| Global Logging service | X |  |  |  |  |  |  |  |  |
| Nodal Logging service | X |  |  |  |  |  |  |  |  |
| Data mining service | X |  | X |  | X |  |  |  |  |
| Journaling service | X |  | X |  |  |  |  | X | X |

|  | Fault Tolerance | Master | Obsolescense | Performance | Predictive Failure Analysis | Provisioning | Security | Storage Node |
|---|---|---|---|---|---|---|---|---|
| Accounting Service |  | X | X | X | X | X | X | X |
| Audit Service |  | X | X | X | X | X | X | X |
| Publish subscribe service | X | X | X | X | X | X | X | X |
| Global Antivirus service |  | X |  |  |  |  | X | X |
| Nodal Antivirus service |  | X |  |  |  |  | X | X |
| Attribute service | X |  | X | X |  | X | X | X |
| Data cell cache |  |  |  |  |  |  |  | X |
| Name space cache service |  |  |  |  |  |  |  |  |
| Compression service |  |  |  | X |  |  |  | X |
| Data mover service |  |  |  | X |  |  |  | X |
| Deletion service |  |  |  |  |  |  |  | X |
| Replication service | X |  |  | X |  | X |  | X |
| Restore service |  |  |  |  |  |  |  | X |
| Version control service |  |  | X |  |  |  |  | X |
| Configuration service |  | X | X | X |  | X |  |  |
| Globalname space service |  |  | X |  |  |  |  | X |
| Topology service |  | X |  | X |  | X |  | X |
| File locking service |  |  |  |  |  |  |  | X |
| Global Logging service | X |  |  |  | X |  |  |  |
| Nodal Logging service | X |  |  |  | X |  |  |  |
| Data mining service |  |  |  |  |  |  |  | X |
| Journaling service | X |  |  |  |  |  |  | X |

TABLE 2

|  | Accounting | Capacity | Data Entry Node | Data Expiration | Data Mining | Data Placement | Data Protection | Diagnostic | Disaster Recovery |
|---|---|---|---|---|---|---|---|---|---|
| Accounting | X | X | X |  |  | X |  | X | X |
| Capacity | X | X | X | X |  |  |  |  |  |
| Data Entry Node | X | X | X |  | X | X | X |  | X |
| Data Expiration |  | X |  | X |  |  |  |  |  |
| Data Mining |  |  | X |  | X |  |  |  |  |
| Data Placement | X |  | X |  |  | X | X |  |  |
| Data Protection |  |  | X |  |  | X | X |  |  |
| Diagnostic | X |  |  |  |  |  |  | X | X |
| Disaster Recovery | X |  | X |  |  |  |  | X | X |
| Fault Tolerance |  |  | X |  |  | X | X | X |  |
| Master |  |  | X |  |  |  |  | X | X |
| Obsolescense | X |  |  | X |  | X | X | X |  |
| Performance | X | X | X |  |  | X | X | X |  |

TABLE 2-continued

| | | | | | | | | |
|---|---|---|---|---|---|---|---|---|
| Predictive Failure Analysis | X | | | | | X | X | X |
| Provisioning | X | X | | X | | X | X | |
| Security | X | X | X | X | | X | | X |
| Storage Node | X | X | X | X | X | X | X | X |

| | Fault Tolerance | Master | Obsolescense | Performance | Predictive Failure Analysis | Provisioning | Security | Storage Node |
|---|---|---|---|---|---|---|---|---|
| Accounting | | | X | X | X | X | X | X |
| Capacity | | | | X | | X | X | X |
| Data Entry Node | X | X | | X | | | X | X |
| Data Expiration | | | X | | | X | X | X |
| Data Mining | | | | | | | | X |
| Data Placement | X | | X | X | | X | X | X |
| Data Protection | X | | X | X | X | X | | X |
| Diagnostic | X | X | X | X | X | | X | X |
| Disaster Recovery | | X | | | X | | | X |
| Fault Tolerance | X | | | X | X | X | | X |
| Master | | X | | | | | X | X |
| Obsolescense | | | X | | | | | X |
| Performance | | | | X | | X | | X |
| Predictive Failure Analysis | X | | | | X | | | X |
| Provisioning | X | | | X | | X | X | X |
| Security | | X | | | | X | X | X |
| Storage Node | X | X | X | X | X | X | X | X |

TABLE 3

| | Accounting Service | Audit Service | Publish subscribe service | Global Antivirus service | Nodal Antivirus service | Attribute service | Data cell cache | Name space cache service |
|---|---|---|---|---|---|---|---|---|
| Accounting Service | X | X | X | | | X | | |
| Audit Service | | X | X | | | X | | |
| Publish subscribe service | | | X | X | X | X | X | X |
| Global Antivirus service | | | | X | X | | | |
| Nodal Antivirus service | | | | | X | | | |
| Attribute service | | | | | | X | | |
| Data cell cache | | | | | | | X | X |
| Name space cache service | | | | | | | | X |
| Compression service | | | | | | | | |
| Data mover service | | | | | | | | |
| Deletion service | | | | | | | | |
| Replication service | | | | | | | | |
| Restore service | | | | | | | | |
| Version control service | | | | | | | | |
| Configuration service | | | | | | | | |
| Globalname space service | | | | | | | | |
| Topology service | | | | | | | | |
| File locking service | | | | | | | | |
| Global Logging service | | | | | | | | |
| Nodal Logging service | | | | | | | | |
| Data mining service | | | | | | | | |
| Journaling service | | | | | | | | |

| | Compression service | Data mover service | Deletion service | Replication service | Restore service | Version control service | Configuration service |
|---|---|---|---|---|---|---|---|
| Accounting Service | | | | | | X | |
| Audit Service | | | | | | X | |
| Publish subscribe service | X | X | X | X | X | X | X |
| Global Antivirus service | | | | | | | |
| Nodal Antivirus service | | | | | | | |
| Attribute service | | X | X | X | X | | |
| Data cell cache | X | X | X | X | X | X | |
| Name space cache service | X | | | | | | |
| Compression service | X | X | | | | | |
| Data mover service | | X | | X | X | X | |
| Deletion service | | | X | | | | |
| Replication service | | | | X | | | |
| Restore service | | | | | X | | |
| Version control service | | | | | | X | |
| Configuration service | | | | | | | X |

TABLE 3-continued

Globalname space service
Topology service
File locking service
Global Logging service
Nodal Logging service
Data mining service
Journaling service

|  | Globalname space service | Topology service | File locking service | Global Logging service | Nodal Logging service | Data mining service | Journaling service |
| --- | --- | --- | --- | --- | --- | --- | --- |
| Accounting Service | X | X |  |  |  |  |  |
| Audit Service | X | X |  |  |  |  |  |
| Publish subscribe service | X | X | X | X | X | X | X |
| Global Antivirus service |  |  |  |  |  |  |  |
| Nodal Antivirus service |  |  |  |  |  |  |  |
| Attribute service | X |  |  |  |  |  |  |
| Data cell cache | X |  | X |  |  |  |  |
| Name space cache service | X |  | X |  |  |  |  |
| Compression service |  |  |  |  |  |  |  |
| Data mover service | X |  |  |  |  |  |  |
| Deletion service | X |  |  |  |  |  | X |
| Replication service | X |  |  |  |  |  |  |
| Restore service |  | X |  |  |  |  |  |
| Version control service |  |  |  |  |  |  |  |
| Configuration service |  | X |  |  |  |  |  |
| Globalname space service | X |  | X | X | X | X | X |
| Topology service |  | X |  |  |  |  |  |
| File locking service |  |  | X |  |  |  |  |
| Global Logging service |  |  |  | X | X |  |  |
| Nodal Logging service |  |  |  |  | X |  | X |
| Data mining service |  |  |  |  |  | X |  |
| Journaling service |  |  |  |  |  |  | X |

What is claimed is:

1. A computer-readable medium storage medium storing a program that, when executed by a processor, causes the processor to:
   receive a file from a client machine;
   create metadata regarding the file, and wherein the metadata defines at least in part data management preferences for the file;
   implement, autonomously of a user of the file, storage strategies for the file based on the metadata and in a namespace different than the client machine namespace; and
   store the file on one or more storage devices selected by a software agent based on the metadata.

2. The computer-readable medium as defined in claim 1 wherein when the processor creates metadata the program further causes the processor to receive from at least one of the user or a system administrator a desired access speed for the file.

3. The computer-readable medium as defined in claim 1 wherein when the processor creates metadata the program further causes the processor to receive from at least one of the user or a system administrator a desired reliability for the file.

4. The computer-readable medium as defined in claim 1 wherein the program further causes the processor to move the file to a different set of one or more storage devices based on the metadata.

5. The computer-readable medium as defined in claim 1 wherein the program further causes the processor to delete the file after an expiration of a period of time indicated in the metadata.

6. The computer-readable medium as defined in claim 1 wherein the program further causes the processor to provide the file to the user from a storage device without the user having to select the source from which the file is provided.

7. A computing system comprising:
   a host computer that executes user programs;
   a server coupled to the host computer;
   a plurality of storage devices coupled to the server;
   wherein the host computer communicates files to the server for storage on at least one of the plurality of storage devices, wherein the server appears to be a network storage device operating in a user name space and in a user file structure; and
   wherein the server selects on which of the plurality of storage devices to store the files on a file-by-file basis based on storage characteristic preferences supplied for each file, and wherein each file is stored under a globally unique name in a global namespace of the server.

8. The computer system as defined in claim 7 wherein each of the plurality of storage devices has an access speed, and wherein the server selects one or more of the plurality of storage devices based on access speed preferences supplied for each file.

9. The computer system as defined in claim 7 wherein each of the plurality of storage devices has a reliability, and wherein the the server selects one or more of the plurality of storage devices based on reliability preferences supplied for each file.

10. The computer system as defined in claim 7 wherein the server migrates a file from a first of the plurality of storage devices to a second of the plurality of storage device without direction from the user programs.

11. The computer system as defined in claim 10 wherein the server migrates the file based on expiration of a time period specified in the storage characteristic preferences for the file.

12. The computer system as defined in claim 10 wherein the server migrates the file based on obsolescence of the first of the plurality of storage devices as determined by the programs executing on the server.

13. The computer system as defined in claim 7 wherein the server deletes a file from the plurality of storage devices without direction from the user programs based on expiration of a time period specified in the storage characteristic preferences for the file.

14. A system comprising:
a client computer;
a server coupled to the client computer;
a first storage device, distinct from the server, the first storage device coupled to the server and the first storage device having a storage attribute;
a second storage device, distinct from the first storage device and distinct from the server, the second stage device coupled to the server and the second storage device having a storage attribute;
wherein the server is configured to accept files in a user namespace and in a user file structure; and
wherein the server stores the file on at least one of the first and second storage devices in a global namespace different than the user namespace, the selection of the storage location made by the server based on the attributes of the storage devices and storage preferences for the file.

15. The system as defined in claim 14 wherein the server further comprises:
a software agent that executes on the server;
wherein the software agent interfaces with the client computer and simulates the network storage device operating in the user namespace; and
wherein the software agent decides on which of the first and second storage devices to store the file based on the attributes of the storage devices and the storage preference for the file.

16. The system as defined in claim 15 wherein the server further comprises:
a software service that executes on the server; and
wherein the software service stores the file on one of the first and second storage devices based on instructions from the software agent.

17. The system as defined in claim 16 further comprising:
a first software service associated with the first storage device, the first software service executes on the server;
a second software service associated with the second storage device, the second software service executes on the server; and
wherein the software agent directs at least one of the first and second software services to store the file on the storage device to which the software service is associated.

18. A computing system comprising:
a first means for executing programs;
a second means for executing programs coupled to the first means for executing;
a plurality of means for storing programs and data coupled to the second means for executing;
wherein the first means for executing communicates files to the second means for executing for storage on at least one of the plurality means for storing, wherein the second means for executing to be a network storage device operating in a file structure of the first means for executing; and
wherein program executing on the second means for executing selects on which of the plurality of means for storing to store the files on a file-by-file basis based on storage characteristic preferences supplied for each file, and wherein each file is stored under a globally unique name in a global namespace of the plurality of means for storing.

19. The computer system as defined in claim 18 wherein each of the plurality of means for storing has an access speed, and wherein the program executing on the second means for executing selects one or more of the plurality of means for storing based on access speed preferences supplied for each file.

20. The computer system as defined in claim 18 wherein each of the plurality of means for storing has a reliability, and wherein the program executing on the second means for executing selects one or more of the plurality of means for storing based on reliability preferences supplied for each file.

21. The computer system as defined in claim 18 wherein the program executing on the second means for storing migrates a file from a first of the plurality of means for storing to a second of the plurality of means for storing without direction from the user programs.

22. The computer system as defined in claim 21 wherein the program executing on the second means for storing migrates the file based on expiration of a time period specified in the storage characteristic preferences for the file.

23. The computer system as defined in claim 21 wherein the program executing on the second means for storing migrates the file based on obsolescence of one of the plurality of means for storing as determined by the program executing on the second means for storing.

24. The computer system as defined in claim 18 wherein the program executing on the second means for storing deletes a file from the plurality of means for storing without direction from the user based on expiration of a time period specified in the storage characteristic preferences for the file.

* * * * *

UNITED STATES PATENT AND TRADEMARK OFFICE
CERTIFICATE OF CORRECTION

PATENT NO. : 7,647,327 B2
APPLICATION NO. : 10/669822
DATED : January 12, 2010
INVENTOR(S) : Jerry G. Aguren It is certified that error appears in the above-identified patent and that said Letters Patent is hereby corrected as shown below:

In column 23, line 35, in Claim 1, after "readable" delete "medium".

In column 24, line 57, in Claim 9, after "the" delete "the".

Signed and Sealed this

Twenty-fifth Day of May, 2010

David J. Kappos
*Director of the United States Patent and Trademark Office*